United States Patent
Yan et al.

(10) Patent No.: US 9,462,619 B2
(45) Date of Patent: Oct. 4, 2016

(54) METHOD FOR ESTABLISHING X2 INTERFACE IPSEC TUNNEL, BASE STATION, SYSTEM AND COMPUTER STORAGE MEDIUM

(71) Applicant: ZTE Corporation, Shenzhen, Guangdong (CN)

(72) Inventors: Gongxiao Yan, Shenzhen (CN); Shunbin Li, Shenzhen (CN)

(73) Assignee: ZTE CORPORATION, Shenzhen, Guangdon (CN)

( * ) Notice: Subject to any disclaimer, the term of this patent is extended or adjusted under 35 U.S.C. 154(b) by 0 days.

(21) Appl. No.: 14/432,833

(22) PCT Filed: Dec. 31, 2013

(86) PCT No.: PCT/CN2013/091132
§ 371 (c)(1),
(2) Date: Apr. 1, 2015

(87) PCT Pub. No.: WO2014/117623
PCT Pub. Date: Aug. 7, 2014

(65) Prior Publication Data
US 2015/0282222 A1    Oct. 1, 2015

(30) Foreign Application Priority Data

Jan. 30, 2013  (CN) .......................... 201310035459

(51) Int. Cl.
*H04W 76/02* (2009.01)
*H04L 29/06* (2006.01)
(Continued)

(52) U.S. Cl.
CPC ........ *H04W 76/021* (2013.01); *H04L 63/0428* (2013.01); *H04L 63/164* (2013.01); *H04L 63/20* (2013.01); *H04W 12/04* (2013.01); *H04W 76/022* (2013.01); *H04W 92/20* (2013.01)

(58) Field of Classification Search
None
See application file for complete search history.

(56) References Cited

U.S. PATENT DOCUMENTS 8,484,473 B2    7/2013  Zee
2011/0225424 A1  9/2011  Zee et al.
(Continued)

FOREIGN PATENT DOCUMENTS

CN    101321101 A    12/2008
CN    101656961 A    2/2010
(Continued)

OTHER PUBLICATIONS

International Search Report in international application No. PCT/CN2013/091132, mailed on Apr. 3, 2014.
(Continued)

*Primary Examiner* — Diane Lo
(74) *Attorney, Agent, or Firm* — Oppedahl Patent Law Firm LLC

(57) ABSTRACT

Disclosed is a method for establishing an X2 interface IPSec tunnel. The method comprises: obtaining, by using S1 signaling, IP information of a peer end base station for establishing an inter-base station X2 interface coupling link; automatically generating or receiving configuration data automatically generated and delivered by an operation and maintenance center and used for establishing the inter-base station X2 interface coupling link and configuration data used for establishing an inter-base station X2 interface IPSec tunnel; generating an X2 interface coupling packet according to the configuration data used for establishing the inter-base station X2 interface coupling link; and generating an IPSec negotiation packet according to the configuration data used for establishing the inter-base station X2 interface IPSec tunnel, and triggering the establishment of the inter-base station X2 interface IPSec tunnel by using the X2 interface coupling packet. Also disclosed are a base station, a system and a computer storage medium.

17 Claims, 4 Drawing Sheets

(51) Int. Cl.
*H04W 12/04* (2009.01)
*H04W 92/20* (2009.01)

(56) References Cited

U.S. PATENT DOCUMENTS

| | | | |
|---|---|---|---|
| 2011/0263282 A1 | 10/2011 | Rune | |
| 2011/0310791 A1 | 12/2011 | Prakash | |
| 2012/0135771 A1* | 5/2012 | Futaki | H04B 7/024 455/509 |
| 2014/0126562 A1* | 5/2014 | Gunnarsson | H04W 92/20 370/338 |

FOREIGN PATENT DOCUMENTS

| | | |
|---|---|---|
| CN | 101753531 A | 6/2010 |
| CN | 101754305 A | 6/2010 |
| CN | 102711106 A | 10/2012 |
| CN | 103220818 A | 7/2013 |
| EP | 2445146 A1 | 4/2012 |
| JP | 2011517905 A | 6/2011 |
| JP | 2012508493 A | 4/2012 |
| WO | 2010052169 A1 | 5/2010 |
| WO | 2011163403 A | 12/2011 |

OTHER PUBLICATIONS

Supplementary European Search Report in European application No. 13874052.7, mailed on Dec. 7, 2015.
Evolved Universal Terrestrial Radio Access Network(E-UTRAN) ,mailed on Dec. 2012.
English Translation of the Written Opinion of the International Search Authority in international application No. PCT/CN2013/091132, mailed on Apr. 3, 2014.
Ericsson, Address Discovery in the Presence of an X2-GW, 3GPP TSG-RAN WG3 #79 R3-130257, mailed on Jan. 28, 2013.

* cited by examiner

METHOD FOR ESTABLISHING X2 INTERFACE IPSEC TUNNEL, BASE STATION, SYSTEM AND COMPUTER STORAGE MEDIUM

TECHNICAL FIELD

The disclosure relates to the field of mobile communication technology, and in particular to a method and system for establishing an X2 IPSec tunnel, an eNB, and a computer storage medium.

BACKGROUND

With rapid development of mobile communication technology, a third generation mobile communication system has entered a Long Term Evolution (LTE) stage. Due to features such as large amount of telecommunication service data, a complicated network structure, and all-IP based LTE, IP Security (IPSec) technology strengthened data service protection is recommended in 3GPP.

An LTE wireless network includes a huge number of base stations or eNBs (eNodeB, evoluted Node B), where a number of inter-eNB X2 links (with X2 being an inter-eNB interface) increases exponentially with the number of eNBs. With a scale of N eNBs, there may be N*(N−1) pieces of configuration data for inter-eNB X2 SCTP establishment. In implementing inter-eNB X2 link IPSec protection, which involves a Diffie-Hellman (DH) group, an authentication algorithm, and an encryption algorithm in negotiation IPSec tunnel establishment, the number of pieces of configuration data multiplies on the basis of N*(N−1). Therefore, manual X2 IPSec tunnel configuration is very time-consuming, and is error-prone due to a large number of parameters. Improper parameter configuration may lead to a service-impacting failure in inter-eNB X2 link establishment.

SUMMARY

To solve an existing technical problem, an embodiment herein provides a method and system for establishing an X2 IPSec tunnel, an eNB, and a computer storage medium.

According to an embodiment herein, a method for establishing an X2 IPSec tunnel includes:

acquiring, through S1 signaling, IP information for inter-Evolved NodeB (eNB) X2 SCTP link establishment for an opposite eNB;

automatically generating configuration data for inter-eNB X2 SCTP link establishment and configuration data for inter-eNB X2 IPSec tunnel establishment, or receiving configuration data for inter-eNB X2 SCTP link establishment and configuration data for inter-eNB X2 IPSec tunnel establishment automatically generated and issued by an operation and maintenance center (OMC); and generating, according to the configuration data for inter-eNB X2 SCTP link establishment, an X2 SCTP message; generating, according to the configuration data for inter-eNB X2 IPSec tunnel establishment, an IPSec negotiating message; and triggering, through the X2 SCTP message, inter-eNB X2 IPSec tunnel establishment.

According to an embodiment herein, an eNB includes:

an SCTP module configured for acquiring, through S1 signaling, IP information for inter-eNB X2 SCTP link establishment for an opposite eNB;

an acquiring module configured for automatically generating configuration data for inter-eNB X2 SCTP link establishment and configuration data for inter-eNB X2 IPSec tunnel establishment, or receiving configuration data for inter-eNB X2 SCTP link establishment and configuration data for inter-eNB X2 IPSec tunnel establishment automatically generated and issued by an operation and maintenance center (OMC); and an IPSec tunnel establishing module configured for: generating, according to the configuration data for inter-eNB X2 SCTP link establishment, an X2 SCTP message; generating, according to the configuration data for inter-eNB X2 IPSec tunnel establishment, an IPSec negotiating message; and triggering, through the X2 SCTP message, inter-eNB X2 IPSec tunnel establishment.

According to an embodiment herein, a system for establishing an X2 IPSec tunnel, the system includes an Evolved NodeB (eNB) and an operation and maintenance center (OMC).

The eNB is configured for: acquiring, through S1 signaling, IP information for inter-eNB X2 SCTP link establishment for an opposite eNB; automatically generating configuration data for inter-eNB X2 SCTP link establishment and configuration data for inter-eNB X2 IPSec tunnel establishment, or receiving configuration data for inter-eNB X2 SCTP link establishment and configuration data for inter-eNB X2 IPSec tunnel establishment automatically generated and issued by the OMC; generating, according to the configuration data for inter-eNB X2 SCTP link establishment, an X2 SCTP message; generating, according to the configuration data for inter-eNB X2 IPSec tunnel establishment, an IPSec negotiating message; and triggering, through the X2 SCTP message, inter-eNB X2 IPSec tunnel establishment.

The OMC is configured for automatically generating the configuration data for inter-eNB X2 SCTP link establishment and the configuration data for inter-eNB X2 IPSec tunnel establishment, and issuing the configuration data for inter-eNB X2 SCTP link establishment and the configuration data for inter-eNB X2 IPSec tunnel establishment to the eNB.

According to an embodiment herein, a computer storage medium includes instructions which, when executed on a computer or a processor, cause the computer or processor to carry out the method.

With a method and system for establishing an X2 IPSec tunnel, an eNB, and a computer storage medium according to embodiments herein, when an X2 SCTP link between two eNBs has to be created, the eNBs at both ends of the link each may obtain, through S1 signaling, IP information for inter-eNB X2 SCTP link establishment for the opposite end. Then, the eNBs at both ends of the link each may automatically generate configuration data for inter-eNB X2 SCTP link establishment and configuration data for inter-eNB X2 IPSec tunnel establishment, or receive configuration data for inter-eNB X2 SCTP link establishment and configuration data for inter-eNB X2 IPSec tunnel establishment automatically generated and issued by an operation and maintenance center (OMC). After the configuration data take effect respectively on the eNBs at both ends of the link, the eNBs at both ends of the link each may generate an X2 SCTP message and an IPSec negotiating message according to the configuration data, and trigger, through the X2 SCTP message, establishment of an X2 IPSec tunnel between the two eNBs. After the X2 IPSec tunnel between the two eNBs is established, data on the X2 link between the two eNBs are under IPSec protection. As configuration data may be automatically generated by an eNB, or automatically generated by an OMC and issued to an eNB, no manual intervention is required in establishing an X2 IPSec tunnel, avoiding a service-impacting failure in inter-eNB X2 link establishment caused by an improperly configured parameter in manual configuration.

DETAILED DESCRIPTION

According to embodiments herein, when an X2 SCTP link between two eNBs has to be created, the eNBs at both ends of the link each may obtain, through S1 signaling, IP information for inter-eNB X2 SCTP link establishment for the opposite end. Then, the eNBs at both ends of the link each may automatically generate configuration data for inter-eNB X2 SCTP link establishment and configuration data for inter-eNB X2 IPSec tunnel establishment, or receive configuration data for inter-eNB X2 SCTP link establishment and configuration data for inter-eNB X2 IPSec tunnel establishment automatically generated and issued by an operation and maintenance center (OMC). After the configuration data take effect respectively on the eNBs at both ends of the link, the eNBs at both ends of the link each may generate an X2 SCTP message and an IPSec negotiating message according to the configuration data, and trigger, through the X2 SCTP message, establishment of an X2 IPSec tunnel between the two eNBs. After the X2 IPSec tunnel between the two eNBs is established, data on the X2 link between the two eNBs are under IPSec protection.

A technical solution herein is further elaborated below with reference to drawings and specific embodiments.

Figure 1:
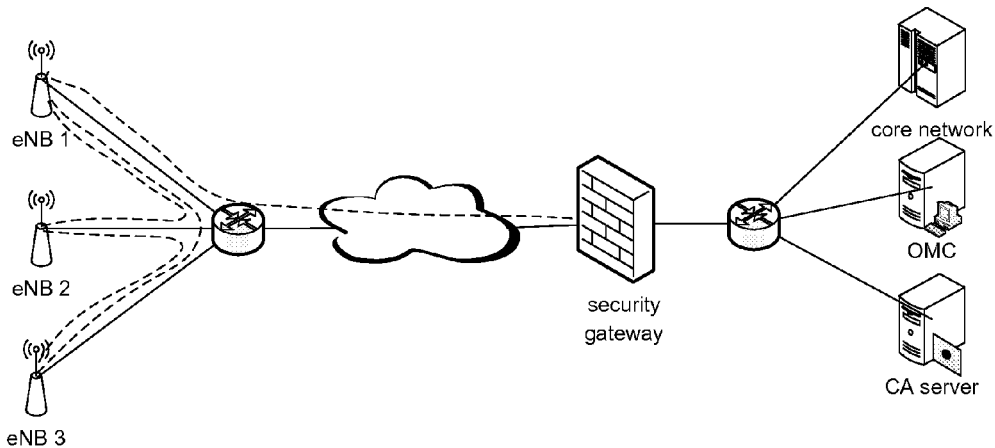
FIG. 1 is a diagram of a structure of network deployment for automatic inter-eNB X2 IPSec tunnel establishment.

FIG. 1 is a diagram of a structure of network deployment for automatically establishing an X2 IPSec tunnel between two eNBs in LTE. The structure may include a core network, an OMC, a CA server, a security gateway, and multiple eNBs, with an IPSec tunnel to the core network established between each eNB and the security gateway.

Figure 2:
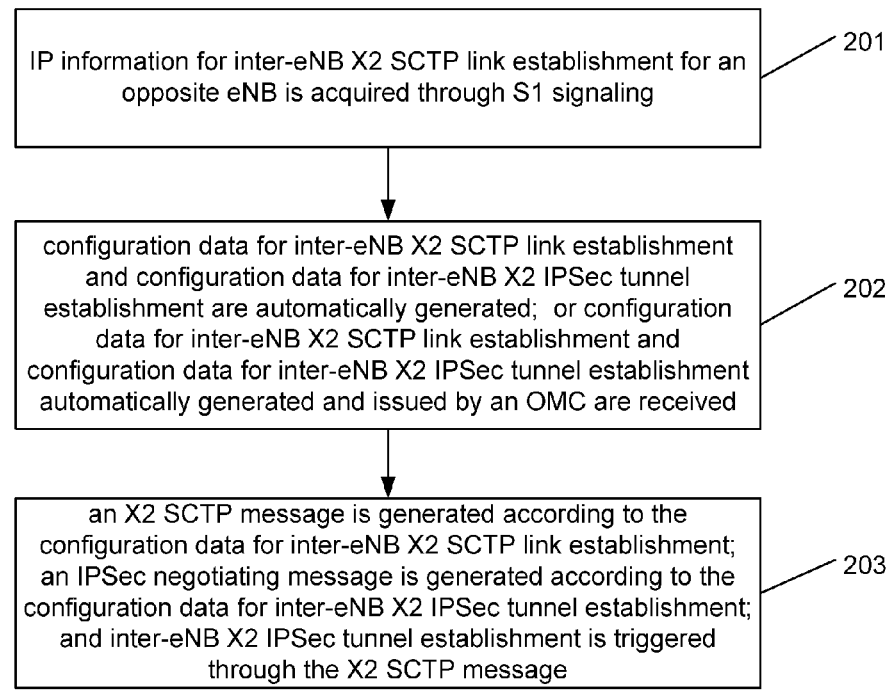
FIG. 2 is a flowchart of a method for establishing an X2 IPSec tunnel according to an embodiment herein.

Based on the architecture shown in FIG. 1, a method for establishing an X2 IPSec tunnel according to an embodiment herein, as shown in FIG. 2, may include steps as follows.

In step 201, IP information for inter-eNB X2 SCTP link establishment for an opposite eNB is acquired by a local eNB through S1 signaling.

A neighborhood relation between the local eNB and the opposite eNB may exist. A neighborhood relation between the local eNB and the opposite eNB may be configured by an OMC (Namely, the local eNB may establish, according to a configuration, a neighborhood relation with the opposite eNB). Alternatively, the local eNB may detect, via ANR neighborhood self-discovery, a neighborhood relation with the opposite eNB.

In step 202, configuration data for inter-eNB X2 SCTP link establishment and configuration data for inter-eNB X2 IPSec tunnel establishment are automatically generated by the local eNB; or configuration data for inter-eNB X2 SCTP link establishment and configuration data for inter-eNB X2 IPSec tunnel establishment automatically generated and issued by an OMC are received by the local eNB.

The step may be implemented in multiple scenarios as follows.

In scenario 1, when the local eNB is not connected to the OMC, a negotiation parameter for inter-eNB X2 IPSec tunnel establishment is acquired from a negotiation parameter corresponding to an established S1 IPSec tunnel.

The local eNB may automatically generate, according to the acquired IP information for inter-eNB X2 SCTP link establishment for the opposite eNB, the configuration data for inter-eNB X2 SCTP link establishment; and automatically generate, according to the acquired negotiation parameter for inter-eNB X2 IPSec tunnel establishment, the configuration data for inter-eNB X2 IPSec tunnel establishment.

Processing at the opposite eNB may be identical to that at the local eNB.

In scenario 2, when the local eNB is connected to the OMC, the acquired IP information for inter-eNB X2 SCTP link establishment for the opposite eNB may be reported to the OMC, such that the OMC automatically generates the configuration data for inter-eNB X2 SCTP link establishment.

When the local eNB detects that the negotiation parameter for inter-eNB X2 IPSec tunnel establishment is generated by the OMC, the OMC automatically generates, according to the negotiation parameter for inter-eNB X2 IPSec tunnel establishment, the configuration data for inter-eNB X2 IPSec tunnel establishment.

The local eNB may receive the configuration data for inter-eNB X2 SCTP link establishment and for inter-eNB X2 IPSec tunnel establishment issued by the OMC.

Processing at the opposite eNB may be identical to that at the local eNB.

In scenario 3, when the local eNB is connected to the OMC, the acquired IP information for inter-eNB X2 SCTP link establishment for the opposite eNB may be reported to the OMC, such that the OMC automatically generates the configuration data for inter-eNB X2 SCTP link establishment.

When the local eNB detects that the negotiation parameter for inter-eNB X2 IPSec tunnel establishment is not generated by the OMC, the local eNB may acquire, from a negotiation parameter corresponding to an established S1 IPSec tunnel, a negotiation parameter for inter-eNB X2 IPSec tunnel establishment, and report, to the OMC, the acquired negotiation parameter for inter-eNB X2 IPSec tunnel establishment, such that the OMC automatically generates the configuration data for inter-eNB X2 IPSec tunnel establishment.

The local eNB may receive the configuration data for inter-eNB X2 SCTP link establishment and for inter-eNB X2 IPSec tunnel establishment issued by the OMC.

Processing at the opposite eNB may be identical to that at the local eNB.

The three scenarios will be described with FIG. 3.

In step 203, the local eNB generates an X2 SCTP message according to the configuration data for inter-eNB X2 SCTP link establishment; generates an IPSec negotiating message according to the configuration data for inter-eNB X2 IPSec tunnel establishment; and triggers inter-eNB X2 IPSec tunnel establishment through the X2 SCTP message.

Figure 3:
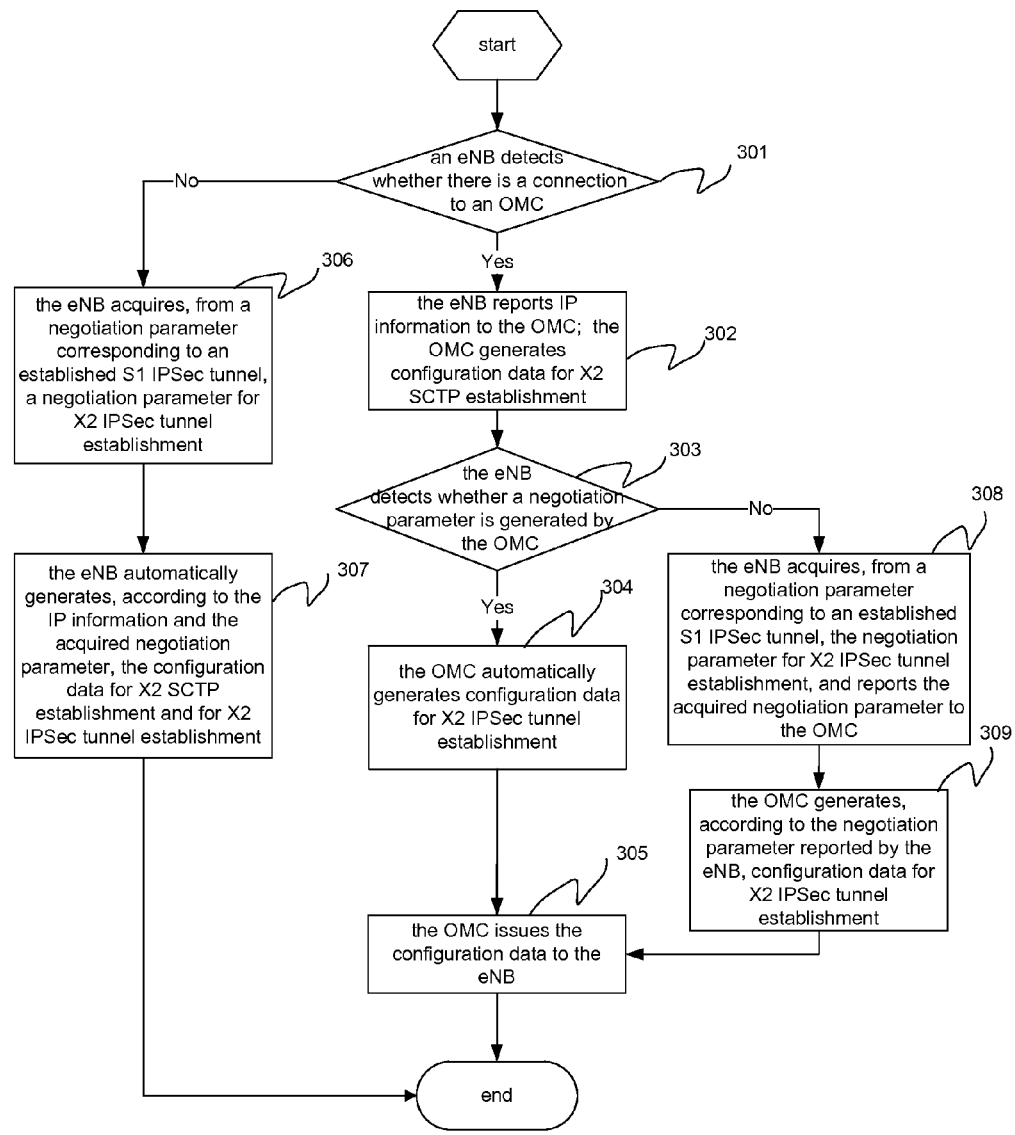
FIG. 3 is a flowchart of acquiring, by an eNB, configuration data for inter-eNB X2 IPSec tunnel establishment and for inter-eNB X2 SCTP link establishment.

A specific flow of implementing step 202, as shown in FIG. 3, may include steps as follows.

In step 301, the local eNB may detect whether it is connected to the OMC. The flow goes to step 302 when the local eNB is connected; otherwise when the local eNB is not connected, the flow goes to step 306.

In step 302, the local eNB reports, to the OMC, the acquired IP information for inter-eNB X2 SCTP link establishment for the opposite eNB (IP information, for short), such that the OMC generates the configuration data for inter-eNB X2 SCTP link establishment.

In step 303, the local eNB may detect whether a negotiation parameter for inter-eNB X2 IPSec tunnel establishment (negotiation parameter, for short) is generated by the OMC. When it is generated by the OMC, the flow goes to step 304; otherwise when it is not generated by the OMC, the flow goes to step 308.

The negotiation parameter may include an IKE authentication mode, an encryption algorithm, an authentication algorithm, a DH group, a life cycle, an IPSec mode, an encryption algorithm, an authentication algorithm, a life cycle, etc.

In step 304, the OMC may automatically generate, according to template data or an operator planned negotiation parameter, the configuration data for inter-eNB X2 IPSec tunnel establishment.

In step 305, the OMC may issue the configuration data in step 302 and in step 304 to the local eNB; the flow ends.

In step 306, following step 301, when the local eNB is not connected to the OMC, a negotiation parameter for inter-eNB X2 IPSec tunnel establishment may be acquired from a negotiation parameter corresponding to an established S1 IPSec tunnel.

In step 307, the local eNB may automatically generate, according to the acquired IP information, the configuration data for inter-eNB X2 SCTP link establishment; and automatically generate, according to the acquired negotiation parameter, the configuration data for inter-eNB X2 IPSec tunnel establishment; the flow ends.

In step 308, following step 303, when the negotiation parameter is not generated by the OMC, the local eNB may acquire a negotiation parameter for inter-eNB X2 IPSec tunnel establishment from a negotiation parameter corresponding to an established S1 IPSec tunnel, and report, to the OMC, the acquired negotiation parameter for inter-eNB X2 IPSec tunnel establishment.

In step 309, the OMC may automatically generate, according to the reported negotiation parameter, the configuration data for inter-eNB X2 IPSec tunnel establishment. Then the flow goes to step 305, namely, the OMC may issue configuration data in step 302 and step 309 to the local eNB; the flow ends.

For the flow, processing at the opposite eNB may be identical to that at the local eNB.

An aforementioned technical solution herein is described below through specific embodiments. An X2 SCTP link between a first eNB and a second eNB is to be created.

Embodiment 1

In step 10, a neighborhood relation between the two eNBs may be configured by an OMC. However, no X2 SCTP link between the two eNBs has been configured.

In step 11, the first eNB and the second eNB configured with a neighborhood relation each may obtain, through S1 signaling, IP information for inter-eNB X2 SCTP link establishment for the opposite eNB.

In step 12, the first eNB and the second eNB each may detect whether there is a local connection to the OMC. When neither eNB is connected to the OMC, the flow goes to the next step.

In step 13, the first eNB and the second eNB each may acquire, from a negotiation parameter corresponding to an established local S1 IPSec tunnel to a security gateway, a negotiation parameter for inter-eNB X2 IPSec tunnel establishment.

In step 14, the first eNB and the second eNB may automatically generate, according to IP information acquired in step 11, the configuration data for inter-eNB X2 SCTP link establishment; automatically generate, according to the negotiation parameter acquired in step 13, the configuration data for inter-eNB X2 IPSec tunnel establishment.

In step 15, the first eNB and/or the second eNB may generate, according to the configuration data for inter-eNB X2 SCTP link establishment, a message for inter-eNB X2 SCTP link establishment (i.e., X2 SCTP message); generate, according to the configuration data for inter-eNB X2 IPSec tunnel establishment, an IPSec negotiating message. Inter-eNB X2 IPSec tunnel establishment may be triggered by the X2 SCTP message. Then the X2 link is under IPSec protection.

Embodiment 2

In step 20, a neighborhood relation between the two eNBs may be configured by an OMC. However, no X2 SCTP link between the two eNBs has been configured.

In step 21, the first eNB and the second eNB configured with a neighborhood relation each may obtain, through S1 signaling, IP information for inter-eNB X2 SCTP link establishment for the opposite eNB.

In step 22, the first eNB and the second eNB each may detect whether there is a local connection to the OMC. When both eNBs are connected to the OMC, the flow goes to the next step.

In step 23, the first eNB and the second eNB may report the IP information to the OMC, such that the OMC automatically generates configuration data for inter-eNB X2 SCTP link establishment.

In step 24, the first eNB and the second eNB each may detect whether a negotiation parameter is generated by the OMC. When it is generated by the OMC, the flow goes to the next step.

In step 25, the OMC may automatically generate, according to template data or an operator planned negotiation parameter, configuration data for inter-eNB X2 IPSec tunnel establishment.

In step 26, the OMC may issue the configuration data in step 23 and step 25 to the first eNB and the second eNB.

In step 27, the first eNB and/or the second eNB may generate, according to the configuration data for inter-eNB X2 SCTP link establishment, a message for inter-eNB X2 SCTP link establishment (i.e., X2 SCTP message); generate, according to the configuration data for inter-eNB X2 IPSec tunnel establishment, an IPSec negotiating message. Inter-eNB X2 IPSec tunnel establishment may be triggered by the X2 SCTP message. Then the X2 link is under IPSec protection.

Embodiment 3

In step 30, a neighborhood relation between the two eNBs may be configured by an OMC. However, no X2 SCTP link between the two eNBs has been configured.

In step 31, the first eNB and the second eNB configured with a neighborhood relation each may obtain, through S1 signaling, IP information for inter-eNB X2 SCTP link establishment for the opposite eNB.

In step 32, the first eNB and the second eNB each may detect whether there is a local connection to the OMC. When both eNBs are connected to the OMC, the flow goes to the next step.

In step 33, the first eNB and the second eNB may report the IP information to the OMC, such that the OMC automatically generates configuration data for inter-eNB X2 SCTP link establishment.

In step 34, the first eNB and the second eNB each may detect whether a negotiation parameter is generated by the OMC. When it is not generated by the OMC, the flow goes to the next step.

In step 35, the first eNB and the second eNB each may acquire, from a negotiation parameter corresponding to an established local S1 IPSec tunnel to a security gateway, a negotiation parameter for inter-eNB X2 IPSec tunnel establishment, and report an acquired negotiation parameter to the OMC.

In step 36, the OMC may automatically generate, according to any negotiation parameter reported by the first eNB and the second eNB, configuration data for inter-eNB X2 IPSec tunnel establishment.

In step 37, the OMC may issue the configuration data in step 34 and step 37 to the first eNB and the second eNB.

In step 38, the first eNB and/or the second eNB may generate, according to the configuration data for inter-eNB X2 SCTP link establishment, a message for inter-eNB X2 SCTP link establishment (i.e., X2 SCTP message); generate, according to the configuration data for inter-eNB X2 IPSec tunnel establishment, an IPSec negotiating message. Inter-eNB X2 IPSec tunnel establishment may be triggered by the X2 SCTP message. Then the X2 link is under IPSec protection.

Embodiment 4

In step 40, triggered by ANR neighborhood self-discovery, the first eNB detects a neighborhood relation with the second eNB. However, no X2 SCTP link between the two eNBs has been configured.

In step 41, the first eNB and the second eNB in the neighborhood relation each may obtain, through S1 signaling, IP information for inter-eNB X2 SCTP link establishment for the opposite eNB.

In step 42, the first eNB and the second eNB each may detect whether there is a local connection to the OMC. When neither eNB is connected to the OMC, the flow goes to the next step.

In step 43, the first eNB and the second eNB each may acquire, from a negotiation parameter corresponding to an established local S1 IPSec tunnel to a security gateway, a negotiation parameter for inter-eNB X2 IPSec tunnel establishment.

In step 44, the first eNB and the second eNB may automatically generate, according to IP information acquired in step 41, the configuration data for inter-eNB X2 SCTP link establishment; automatically generate, according to the negotiation parameter acquired in step 43, the configuration data for inter-eNB X2 IPSec tunnel establishment.

In step 45, the first eNB and/or the second eNB may generate, according to the configuration data for inter-eNB X2 SCTP link establishment, a message for inter-eNB X2 SCTP link establishment (i.e., X2 SCTP message); generate, according to the configuration data for inter-eNB X2 IPSec tunnel establishment, an IPSec negotiating message. Inter-eNB X2 IPSec tunnel establishment may be triggered by the X2 SCTP message. Then the X2 link is under IPSec protection.

Embodiment 5

In step 50, triggered by ANR neighborhood self-discovery, the first eNB detects a neighborhood relation with the second eNB. However, no X2 SCTP link between the two eNBs has been configured.

In step 51, the first eNB and the second eNB in the neighborhood relation each may obtain, through S1 signaling, IP information for inter-eNB X2 SCTP link establishment for the opposite eNB.

In step 52, the first eNB and the second eNB each may detect whether there is a local connection to the OMC. When both eNBs are connected to the OMC, the flow goes to the next step.

In step 53, the first eNB and the second eNB may report the IP information to the OMC, such that the OMC automatically generates configuration data for inter-eNB X2 SCTP link establishment.

In step 54, the first eNB and the second eNB each may detect whether a negotiation parameter is generated by the OMC. When it is generated by the OMC, the flow goes to the next step.

In step 55, the OMC may automatically generate, according to template data or an operator planned negotiation parameter, configuration data for inter-eNB X2 IPSec tunnel establishment.

In step 56, the OMC may issue the configuration data in step 53 and step 55 to the first eNB and the second eNB.

In step 57, the first eNB and/or the second eNB may generate, according to the configuration data for inter-eNB X2 SCTP link establishment, a message for inter-eNB X2 SCTP link establishment (i.e., X2 SCTP message); generate, according to the configuration data for inter-eNB X2 IPSec tunnel establishment, an IPSec negotiating message. Inter-eNB X2 IPSec tunnel establishment may be triggered by the X2 SCTP message. Then the X2 link is under IPSec protection.

Embodiment 6

In step 60, triggered by ANR neighborhood self-discovery, the first eNB detects a neighborhood relation with the second eNB. However, no X2 SCTP link between the two eNBs has been configured.

In step 61, the first eNB and the second eNB in the neighborhood relation each may obtain, through S1 signaling, IP information for inter-eNB X2 SCTP link establishment for the opposite eNB.

In step 62, the first eNB and the second eNB each may detect whether there is a local connection to the OMC. When both eNBs are connected to the OMC, the flow goes to the next step.

In step 63, the first eNB and the second eNB may report the IP information to the OMC, such that the OMC automatically generates configuration data for inter-eNB X2 SCTP link establishment.

In step 64, the first eNB and the second eNB each may detect whether a negotiation parameter is generated by the OMC. When it is not generated by the OMC, the flow goes to the next step.

In step 65, the first eNB and the second eNB each may acquire, from a negotiation parameter corresponding to an established local S1 IPSec tunnel to a security gateway, a negotiation parameter for inter-eNB X2 IPSec tunnel establishment, and report an acquired negotiation parameter to the OMC.

In step 66, the OMC may automatically generate, according to any negotiation parameter reported by the first eNB and the second eNB, configuration data for inter-eNB X2 IPSec tunnel establishment.

In step 67, the OMC may issue the configuration data in step 34 and step 37 to the first eNB and the second eNB.

In step 68, the first eNB and/or the second eNB may generate, according to the configuration data for inter-eNB X2 SCTP link establishment, a message for inter-eNB X2 SCTP link establishment (i.e., X2 SCTP message); generate, according to the configuration data for inter-eNB X2 IPSec tunnel establishment, an IPSec negotiating message. Inter-eNB X2 IPSec tunnel establishment may be triggered by the X2 SCTP message. Then the X2 link is under IPSec protection.

Figure 4:
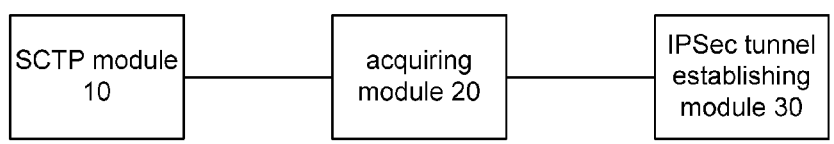
FIG. 4 is a schematic diagram of a structure of an eNB according to an embodiment herein.

To implement the method, the disclosure further provides an eNB. An eNB herein may be the local eNB or the opposite eNB (or the first eNB or the second eNB). As shown in FIG. 4, the eNB may include modules as follows.

An SCTP module 10 is configured for acquiring, through S1 signaling, IP information for inter-eNB X2 SCTP link establishment for an opposite eNB.

An acquiring module 20 is configured for automatically generating configuration data for inter-eNB X2 SCTP link establishment and configuration data for inter-eNB X2 IPSec tunnel establishment, or receiving configuration data for inter-eNB X2 SCTP link establishment and configuration data for inter-eNB X2 IPSec tunnel establishment automatically generated and issued by an OMC.

An IPSec tunnel establishing module 30 is configured for: generating, according to the configuration data for inter-eNB X2 SCTP link establishment, an X2 SCTP message; generating, according to the configuration data for inter-eNB X2 IPSec tunnel establishment, an IPSec negotiating message; and triggering, through the X2 SCTP message, inter-eNB X2 IPSec tunnel establishment.

Figure 5:
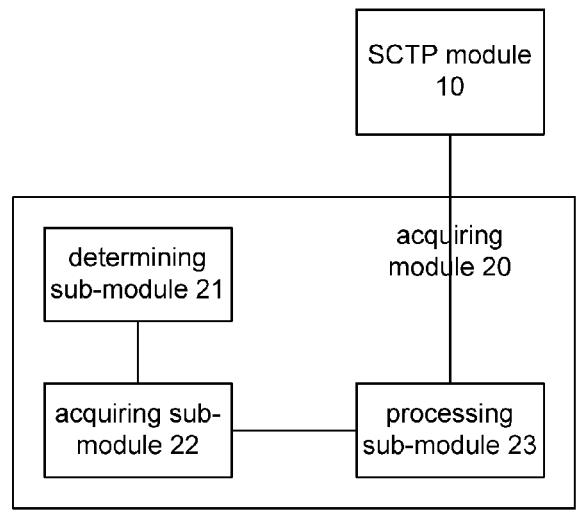
FIG. 5 is a schematic diagram of a structure 1 of the acquiring module in FIG. 4.

As shown in FIG. 5, according to an embodiment herein, a structure of the acquiring module 20 may include a determining sub-module 21, an acquiring sub-module 22, and a processing sub-module 23.

The determining sub-module 21 is configured for determining whether there is a connection to the OMC, and when there is no such connection, informing the acquiring sub-module 22.

The acquiring sub-module 22 is configured for acquiring, from a negotiation parameter corresponding to an established S1 IPSec tunnel, a negotiation parameter for inter-eNB X2 IPSec tunnel establishment.

The processing sub-module 23 is configured for: automatically generating, according to the IP information for inter-eNB X2 SCTP link establishment for the opposite eNB acquired by the SCTP module 10, the configuration data for inter-eNB X2 SCTP link establishment; and automatically generating, according to the negotiation parameter for inter-eNB X2 IPSec tunnel establishment acquired by the acquiring sub-module 22, the configuration data for inter-eNB X2 IPSec tunnel establishment.

Figure 6:
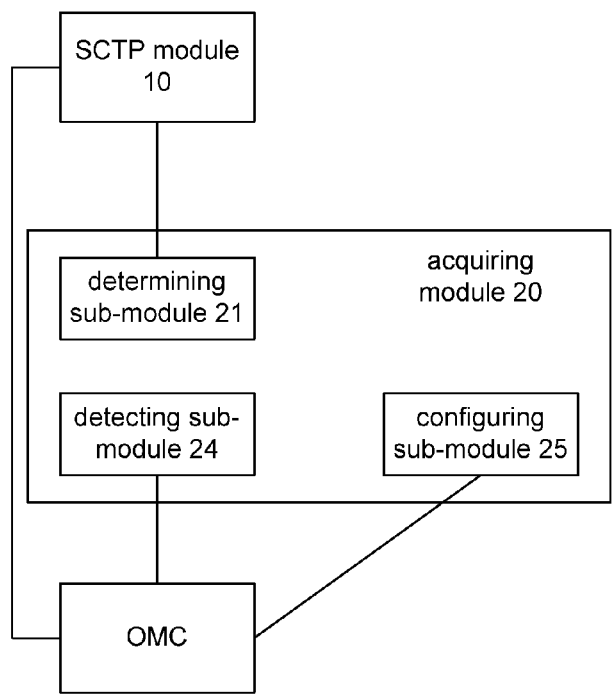
FIG. 6 is a schematic diagram of a structure 2 of the acquiring module in FIG. 4.

As shown in FIG. 6, according to an embodiment herein, a structure of the acquiring module 20 may include a determining sub-module 21, a detecting sub-module 24 and a configuring sub-module 25.

The determining sub-module 21 is configured for determining whether there is a connection to the OMC, and when there is such a connection, informing the SCTP module 10 to report, to the OMC, the acquired IP information for inter-eNB X2 SCTP link establishment for the opposite eNB, such that the OMC automatically generates the configuration data for inter-eNB X2 SCTP link establishment.

The detecting sub-module 24 is configured for: detecting whether a negotiation parameter for inter-eNB X2 IPSec tunnel establishment is generated by the OMC; and when the negotiation parameter for inter-eNB X2 IPSec tunnel establishment is generated by the OMC, informing the OMC to automatically generate the configuration data for inter-eNB X2 IPSec tunnel establishment.

The configuring sub-module 25 is configured for receiving and saving the configuration data for inter-eNB X2 SCTP link establishment and the configuration data for inter-eNB X2 IPSec tunnel establishment automatically generated and issued by the OMC.

Figure 7:
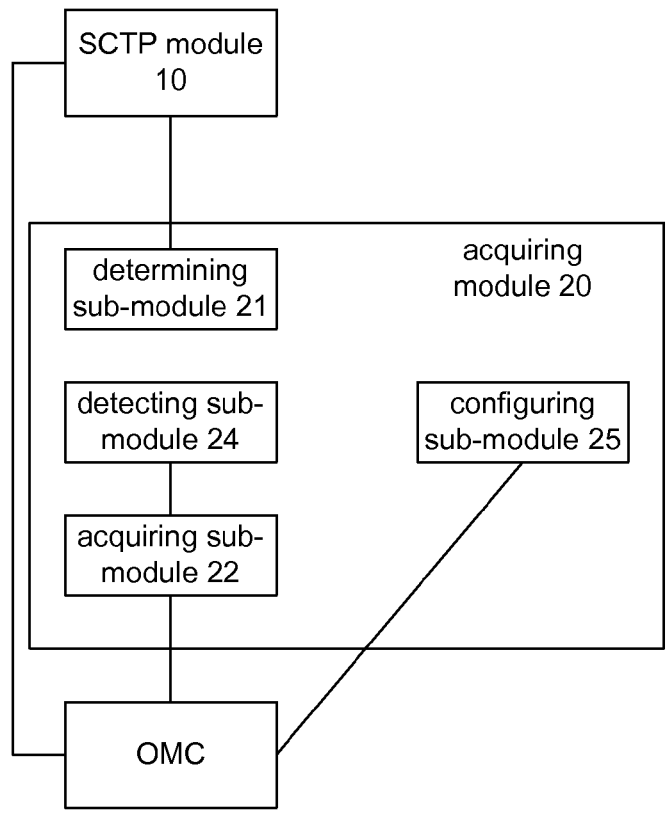
FIG. 7 is a schematic diagram of a structure 3 of the acquiring module in FIG. 4.

As shown in FIG. 7, according to an embodiment herein, a structure of the acquiring module 20 may include a determining sub-module 21, a detecting sub-module 24, an acquiring sub-module 22 and a configuring sub-module 25.

The determining sub-module 21 is configured for determining whether there is a connection to the OMC, and when there is such a connection, informing the SCTP module 10 to report, to the OMC, the acquired IP information for inter-eNB X2 SCTP link establishment for the opposite eNB, such that the OMC automatically generates the configuration data for inter-eNB X2 SCTP link establishment.

The detecting sub-module 24 is configured for: detecting whether a negotiation parameter for inter-eNB X2 IPSec tunnel establishment is generated by the OMC; when the negotiation parameter for inter-eNB X2 IPSec tunnel establishment is not generated by the OMC, informing the acquiring sub-module 22.

The acquiring sub-module 22 is configured for acquiring, from a negotiation parameter corresponding to an established S1 IPSec tunnel, the negotiation parameter for inter-eNB X2 IPSec tunnel establishment, and reporting, to the OMC, the acquired negotiation parameter for inter-eNB X2 IPSec tunnel establishment, such that the OMC automatically generates the configuration data for inter-eNB X2 IPSec tunnel establishment.

The configuring sub-module 25 is configured for receiving and saving the configuration data for inter-eNB X2 SCTP link establishment and the configuration data for inter-eNB X2 IPSec tunnel establishment automatically generated and issued by the OMC.

In addition, the determining sub-module 21, the acquiring sub-module 22, the processing sub-module 23, the detecting sub-module 24 and the configuring sub-module 25 may all be implemented by a Field-Programmable Gate Array (FPGA), a Digital Signal Processor (DSP), a Micro Processing Unit (MPU), or a Central Processing Unit (CPU) in the eNB.

Figure 8:
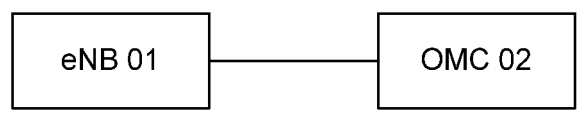
FIG. 8 is a schematic diagram of a structure of a system for establishing an X2 IPSec tunnel according to an embodiment herein.

An embodiment herein further provides a system for establishing an X2 IPSec tunnel. As shown in FIG. 8, the system may include an eNB and an OMC.

The the eNB 01 is configured for: acquiring, through S1 signaling, IP information for inter-eNB X2 SCTP link establishment for an opposite eNB; automatically generating configuration data for inter-eNB X2 SCTP link establishment and configuration data for inter-eNB X2 IPSec tunnel establishment, or receiving configuration data for inter-eNB X2 SCTP link establishment and configuration data for inter-eNB X2 IPSec tunnel establishment automatically generated and issued by the OMC 02; generating, according to the configuration data for inter-eNB X2 SCTP link establishment, an X2 SCTP message; generating, according to the configuration data for inter-eNB X2 IPSec tunnel establishment, an IPSec negotiating message; and triggering, through the X2 SCTP message, inter-eNB X2 IPSec tunnel establishment.

The the OMC 02 is configured for automatically generating the configuration data for inter-eNB X2 SCTP link establishment and the configuration data for inter-eNB X2 IPSec tunnel establishment, and issuing the configuration data for inter-eNB X2 SCTP link establishment and the configuration data for inter-eNB X2 IPSec tunnel establishment to the eNB 01.

In automatically generating the configuration data for inter-eNB X2 SCTP link establishment and the configuration data for inter-eNB X2 IPSec tunnel establishment, the eNB 01 is further configured for: determining whether there is a connection to the OMC 02; when there is no such connection, acquiring, from a negotiation parameter corresponding to an established S1 IPSec tunnel, a negotiation parameter for inter-eNB X2 IPSec tunnel establishment; automatically generating, according to the acquired IP information for inter-eNB X2 SCTP link establishment for the opposite eNB, the configuration data for inter-eNB X2 SCTP link establishment; and automatically generating, according to the negotiation parameter for inter-eNB X2 IPSec tunnel establishment, the configuration data for inter-eNB X2 IPSec tunnel establishment.

In receiving the configuration data for inter-eNB X2 SCTP link establishment and the configuration data for inter-eNB X2 IPSec tunnel establishment automatically generated and issued by the OMC 02, the eNB 01 is further configured for: determining whether there is a connection to the OMC 02; when there is such a connection, reporting, to the OMC 02, the acquired IP information for inter-eNB X2 SCTP link establishment for the opposite eNB; detecting whether a negotiation parameter for inter-eNB X2 IPSec tunnel establishment is generated by the OMC 02; and when the negotiation parameter for inter-eNB X2 IPSec tunnel establishment is generated by the OMC 02, informing the OMC 02.

The OMC 02 is further configured for: automatically generating, according to the IP information for inter-eNB X2 SCTP link establishment reported by the eNB 01, the configuration data for inter-eNB X2 SCTP link establishment, and issuing the generated configuration data for inter-eNB X2 SCTP link establishment to the eNB 01; when informed by the eNB 01, automatically generating the configuration data for inter-eNB X2 IPSec tunnel establishment, and issuing the generated configuration data for inter-eNB X2 IPSec tunnel establishment to the eNB 01.

The eNB 01 is further configured for receiving and saving the configuration data for inter-eNB X2 SCTP link establishment and the configuration data for inter-eNB X2 IPSec tunnel establishment automatically generated and issued by the OMC 02.

In receiving the configuration data for inter-eNB X2 SCTP link establishment and the configuration data for inter-eNB X2 IPSec tunnel establishment automatically generated and issued by the OMC, the eNB 01 is further configured for: determining whether there is a connection to the OMC 02; when there is such a connection, reporting, to the OMC 02, the acquired IP information for inter-eNB X2 SCTP link establishment for the opposite eNB; detecting whether a negotiation parameter for inter-eNB X2 IPSec tunnel establishment is generated by the OMC 02; when the negotiation parameter for inter-eNB X2 IPSec tunnel establishment is not generated by the OMC 02, acquiring, from a negotiation parameter corresponding to an established S1 IPSec tunnel, the negotiation parameter for inter-eNB X2 IPSec tunnel establishment, and reporting, to the OMC 02, the acquired negotiation parameter for inter-eNB X2 IPSec tunnel establishment.

The OMC 02 is further configured for automatically generating, according to the IP information for inter-eNB X2 SCTP link establishment reported by the eNB 01, the configuration data for inter-eNB X2 SCTP link establishment, and issuing the generated configuration data for inter-eNB X2 SCTP link establishment to the eNB 01; automatically generating, according to the negotiation parameter for inter-eNB X2 IPSec tunnel establishment reported by the eNB 01, the configuration data for inter-eNB X2 IPSec tunnel establishment, and issuing the generated configuration data for inter-eNB X2 IPSec tunnel establishment to the eNB 01.

The eNB 01 is further configured for receiving and saving the configuration data for inter-eNB X2 SCTP link establishment and the configuration data for inter-eNB X2 IPSec tunnel establishment automatically generated and issued by the OMC 02.

An internal structure of the eNB 01 may be as shown in FIG. 4-FIG. 7, and is not repeated.

Those skilled in the art should understand that the embodiments described herein may be embodied as a method, system or computer-program product. Therefore, the disclosure may be implemented in form of a hardware embodiment, a software embodiment, or an embodiment of software-hardware combination. Moreover, the disclosure may be in the form of a computer-program product implemented on one or more computer-usable storage media (including, but not limited to disk memory or optical memory) containing computer-usable codes.

The disclosure is illustrated with reference to flowcharts and/or block diagrams of the method, device (system) and computer-program product according to embodiments described herein. Note that each flow in the flowcharts and/or each block in the block diagrams as well as combination of flows in the flowcharts and/or blocks in the block diagrams may be implemented by instructions of a computer program. Such instructions may be offered in a processor of a general-purpose computer, a dedicated computer, an embedded processor or other programmable data processing devices to generate a machine, such that a device with a function specified in one or more flows of the flowcharts and/or one or more blocks in the block diagrams is produced by instructions executed by a processor of a computer or other programmable data processing devices.

These computer-program instructions may also be stored in a non-transitory computer-readable memory capable of guiding a computer or another programmable data processing device to work in a given way, such that the instructions stored in the computer-readable memory generate a manufactured good including an instruction device for implementing a function specified in one or more flows of the flowcharts and/or one or more blocks in the block diagrams.

These computer-program instructions may also be loaded in a computer or other programmable data processing devices, which thus executes a series of operations thereon to generate computer-implemented processing, such that the instructions executed on the computer or other programmable data processing devices provide the steps for implementing the function specified in one or more flows of the flowcharts or one or more blocks in the block diagrams.

An embodiment herein further provides a computer storage medium including instructions which, when executed on a computer or a processor, cause the computer or processor to carry out the method according to an aforementioned embodiment herein.

What described are merely embodiments of the disclosure, and are not intended to limit the scope of the present disclosure.

The invention claimed is:

1. A method for establishing an X2 IPSec tunnel, comprising:
   acquiring, through S1 signaling, IP information for inter-Evolved NodeB (eNB) X2 Stream Control Transmission Protocol (SCTP) link establishment for an opposite eNB;
   automatically generating configuration data for inter-eNB X2 SCTP link establishment and configuration data for inter-eNB X2 IPSec tunnel establishment, or receiving configuration data for inter-eNB X2 SCTP link establishment and configuration data for inter-eNB X2 IPSec tunnel establishment automatically generated and issued by an operation and maintenance center (OMC); and
   generating, according to the configuration data for inter-eNB X2 SCTP link establishment, an X2 SCTP message; generating, according to the configuration data for inter-eNB X2 IPSec tunnel establishment, an IPSec negotiating message; and triggering, through the X2 SCTP message, inter-eNB X2 IPSec tunnel establishment,
   wherein the configuration data for inter-eNB X2 IPSec tunnel establishment is generated according to a negotiation parameter for inter-eNB X2 IPSec tunnel establishment.

2. The method according to claim 1, further comprising: establishing, according to a configuration, a neighborhood relation with the opposite eNB; or detecting, via Automatic Neighbor Relation (ANR) neighborhood self-discovery, a neighborhood relation with the opposite eNB.

3. The method according to claim 2, wherein the automatically generating configuration data for inter-eNB X2 SCTP link establishment and configuration data for inter-eNB X2 IPSec tunnel establishment comprises:
   when there is no connection to the OMC, acquiring, from a negotiation parameter corresponding to an established S1 IPSec tunnel, the negotiation parameter for inter-eNB X2 IPSec tunnel establishment;
   automatically generating, according to the acquired IP information for inter-eNB X2 SCTP link establishment for the opposite eNB, the configuration data for inter-eNB X2 SCTP link establishment; and automatically generating, according to the acquired negotiation parameter for inter-eNB X2 IPSec tunnel establishment, the configuration data for inter-eNB X2 IPSec tunnel establishment.

4. The method according to claim 2, further comprising:
   before the receiving configuration data for inter-eNB X2 SCTP link establishment and configuration data for inter-eNB X2 IPSec tunnel establishment automatically generated and issued by an OMC,
   when there is a connection to the OMC, reporting, to the OMC, the acquired IP information for inter-eNB X2 SCTP link establishment for the opposite eNB, such that the OMC automatically generates the configuration data for inter-eNB X2 SCTP link establishment;
   and when it is detected that the negotiation parameter for inter-eNB X2 IPSec tunnel establishment is generated by the OMC, the OMC automatically generates, according to the negotiation parameter for inter-eNB X2 IPSec tunnel establishment, the configuration data for inter-eNB X2 IPSec tunnel establishment.

5. The method according to claim 2, further comprising: wherein before the receiving configuration data for inter-eNB X2 SCTP link establishment and configuration data for inter-eNB X2 IPSec tunnel establishment automatically generated and issued by an OMC,
   when there is a connection to the OMC, reporting, to the OMC, the acquired IP information for inter-eNB X2 SCTP link establishment for the opposite eNB, such that the OMC automatically generates the configuration data for inter-eNB X2 SCTP link establishment;
   when it is detected that the negotiation parameter for inter-eNB X2 IPSec tunnel establishment is not generated by the OMC, acquiring, from a negotiation parameter corresponding to an established S1 IPSec tunnel, the negotiation parameter for inter-eNB X2 IPSec tunnel establishment, and reporting, to the OMC, the acquired negotiation parameter for inter-eNB X2 IPSec tunnel establishment, such that the OMC automatically generates the configuration data for inter-eNB X2 IPSec tunnel establishment.

6. The method according to claim 1, wherein the automatically generating configuration data for inter-eNB X2 SCTP link establishment and configuration data for inter-eNB X2 IPSec tunnel establishment comprises:
   when there is no connection to the OMC, acquiring, from a negotiation parameter corresponding to an established S1 IPSec tunnel, the negotiation parameter for inter-eNB X2 IPSec tunnel establishment;
   automatically generating, according to the acquired IP information for inter-eNB X2 SCTP link establishment for the opposite eNB, the configuration data for inter-eNB X2 SCTP link establishment; and automatically generating, according to the acquired negotiation parameter for inter-eNB X2 IPSec tunnel establishment, the configuration data for inter-eNB X2 IPSec tunnel establishment.

7. The method according to claim 1, further comprising:
   before the receiving configuration data for inter-eNB X2 SCTP link establishment and configuration data for inter-eNB X2 IPSec tunnel establishment automatically generated and issued by an OMC,
   when there is a connection to the OMC, reporting, to the OMC, the acquired IP information for inter-eNB X2 SCTP link establishment for the opposite eNB, such that the OMC automatically generates the configuration data for inter-eNB X2 SCTP link establishment;
   and when it is detected that the negotiation parameter for inter-eNB X2 IPSec tunnel establishment is generated by the OMC, the OMC automatically generates, according to the negotiation parameter for inter-eNB X2 IPSec tunnel establishment, the configuration data for inter-eNB X2 IPSec tunnel establishment.

8. The method according to claim 1, further comprising: wherein before the receiving configuration data for inter-eNB X2 SCTP link establishment and configuration data for inter-eNB X2 IPSec tunnel establishment automatically generated and issued by an OMC,
   when there is a connection to the OMC, reporting, to the OMC, the acquired IP information for inter-eNB X2

SCTP link establishment for the opposite eNB, such that the OMC automatically generates the configuration data for inter-eNB X2 SCTP link establishment;

when it is detected that the negotiation parameter for inter-eNB X2 IPSec tunnel establishment is not generated by the OMC, acquiring, from a negotiation parameter corresponding to an established S1 IPSec tunnel, the negotiation parameter for inter-eNB X2 IPSec tunnel establishment, and reporting, to the OMC, the acquired negotiation parameter for inter-eNB X2 IPSec tunnel establishment, such that the OMC automatically generates the configuration data for inter-eNB X2 IPSec tunnel establishment.

9. An Evolved NodeB (eNB), comprising:

Stream Control Transmission Protocol (SCTP) module configured for acquiring, through S1 signaling, IP information for inter-eNB X2 SCTP link establishment for an opposite eNB;

an acquiring module configured for automatically generating configuration data for inter-eNB X2 SCTP link establishment and configuration data for inter-eNB X2 IPSec tunnel establishment, or receiving configuration data for inter-eNB X2 SCTP link establishment and configuration data for inter-eNB X2 IPSec tunnel establishment automatically generated and issued by an operation and maintenance center (OMC); and an IPSec tunnel establishing module configured for: generating, according to the configuration data for inter-eNB X2 SCTP link establishment, an X2 SCTP message; generating, according to the configuration data for inter-eNB X2 IPSec tunnel establishment, an IPSec negotiating message; and triggering, through the X2 SCTP message, inter-eNB X2 IPSec tunnel establishment, wherein the configuration data for inter-eNB X2 IPSec tunnel establishment is generated according to a negotiation parameter for inter-eNB X2 IPSec tunnel establishment.

10. The eNB according to claim 9, wherein the acquiring module comprises a determining sub-module, an acquiring sub-module, and a processing sub-module, wherein the determining sub-module is configured for determining whether there is a connection to the OMC, and when there is no such connection, informing the acquiring sub-module;

the acquiring sub-module is configured for acquiring, from a negotiation parameter corresponding to an established S1 IPSec tunnel, the negotiation parameter for inter-eNB X2 IPSec tunnel establishment; and the processing sub-module is configured for: automatically generating, according to the IP information for inter-eNB X2 SCTP link establishment for the opposite eNB acquired by the SCTP module, the configuration data for inter-eNB X2 SCTP link establishment; and automatically generating, according to the negotiation parameter for inter-eNB X2 IPSec tunnel establishment acquired by the acquiring sub-module, the configuration data for inter-eNB X2 IPSec tunnel establishment.

11. The eNB according to claim 9, wherein the acquiring module comprising a determining sub-module, a detecting sub-module, and a configuring sub-module, wherein the determining sub-module is configured for determining whether there is a connection to the OMC, and when there is such a connection, informing the SCTP module to report, to the OMC, the acquired IP information for inter-eNB X2 SCTP link establishment for the opposite eNB, such that the OMC automatically generates the configuration data for inter-eNB X2 SCTP link establishment;

the detecting sub-module is configured for: detecting whether the negotiation parameter for inter-eNB X2 IPSec tunnel establishment is generated by the OMC; and when the negotiation parameter for inter-eNB X2 IPSec tunnel establishment is generated by the OMC, informing the OMC to automatically generate the configuration data for inter-eNB X2 IPSec tunnel establishment; and the configuring sub-module is configured for receiving and saving the configuration data for inter-eNB X2 SCTP link establishment and the configuration data for inter-eNB X2 IPSec tunnel establishment automatically generated and issued by the OMC.

12. The eNB according to claim 9, wherein the acquiring module comprises a determining sub-module, a detecting sub-module, an acquiring sub-module, and a configuring sub-module, wherein the determining sub-module is configured for determining whether there is a connection to the OMC, and when there is such a connection, informing the SCTP module to report, to the OMC, the acquired IP information for inter-eNB X2 SCTP link establishment for the opposite eNB, such that the OMC automatically generates the configuration data for inter-eNB X2 SCTP link establishment;

the detecting sub-module is configured for: detecting whether the negotiation parameter for inter-eNB X2 IPSec tunnel establishment is generated by the OMC; when the negotiation parameter for inter-eNB X2 IPSec tunnel establishment is not generated by the OMC, informing the acquiring sub-module;

the acquiring sub-module is configured for: when informed by the detecting sub-module, acquiring, from a negotiation parameter corresponding to an established S1 IPSec tunnel, the negotiation parameter for inter-eNB X2 IPSec tunnel establishment, and reporting, to the OMC, the acquired negotiation parameter for inter-eNB X2 IPSec tunnel establishment, such that the OMC automatically generates the configuration data for inter-eNB X2 IPSec tunnel establishment; and the configuring sub-module is configured for receiving and saving the configuration data for inter-eNB X2 SCTP link establishment and the configuration data for inter-eNB X2 IPSec tunnel establishment automatically generated and issued by the OMC.

13. A system for establishing an X2 IPSec tunnel, comprising an Evolved NodeB (eNB) and an operation and maintenance center (OMC), wherein the eNB is configured for: acquiring, through S1 signaling, IP information for inter-eNB X2 Stream Control Transmission Protocol (SCTP) link establishment for an opposite eNB; automatically generating configuration data for inter-eNB X2 SCTP link establishment and configuration data for inter-eNB X2 IPSec tunnel establishment, or receiving configuration data for inter-eNB X2 SCTP link establishment and configuration data for inter-eNB X2 IPSec tunnel establishment automatically generated and issued by the OMC; generating, according to the configuration data for inter-eNB X2 SCTP link establishment, an X2 SCTP message; generating, according to the configuration data for inter-eNB X2 IPSec tunnel establishment, an IPSec negotiating message; and triggering, through the X2 SCTP message, inter-eNB X2 IPSec tunnel establishment; and the OMC is configured for automatically generating the configuration data for inter-eNB X2 SCTP link establishment and the configuration data for inter-eNB X2 IPSec tunnel establishment, and issuing the configuration data for inter-eNB X2 SCTP link establishment and the configuration data for inter-eNB X2 IPSec tunnel establishment to the eNB, wherein the configuration data for inter-eNB X2 IPSec tunnel establishment is generated according to a negotiation parameter for inter-eNB X2 IPSec tunnel establishment.

14. The system according to claim 13, wherein in automatically generating the configuration data for inter-eNB X2 SCTP link establishment and the configuration data for inter-eNB X2 IPSec tunnel establishment, the eNB is further configured for: determining whether there is a connection to the OMC; when there is no such connection, acquiring, from a negotiation parameter corresponding to an established S1 IPSec tunnel, the negotiation parameter for inter-eNB X2 IPSec tunnel establishment; automatically generating, according to the acquired IP information for inter-eNB X2 SCTP link establishment for the opposite eNB, the configuration data for inter-eNB X2 SCTP link establishment; and automatically generating, according to the negotiation parameter for inter-eNB X2 IPSec tunnel establishment, the configuration data for inter-eNB X2 IPSec tunnel establishment.

15. The system according to claim 13, wherein in receiving the configuration data for inter-eNB X2 SCTP link establishment and the configuration data for inter-eNB X2 IPSec tunnel establishment automatically generated and issued by the OMC, the eNB is further configured for: determining whether there is a connection to the OMC; when there is such a connection, reporting, to the OMC, the acquired IP information for inter-eNB X2 SCTP link establishment for the opposite eNB; detecting whether the negotiation parameter for inter-eNB X2 IPSec tunnel establishment is generated by the OMC; and when the negotiation parameter for inter-eNB X2 IPSec tunnel establishment is generated by the OMC, informing the OMC;

the OMC is further configured for: automatically generating, according to the IP information for inter-eNB X2 SCTP link establishment reported by the eNB, the configuration data for inter-eNB X2 SCTP link establishment, and issuing the generated configuration data for inter-eNB X2 SCTP link establishment to the eNB; when informed by the eNB, automatically generating the configuration data for inter-eNB X2 IPSec tunnel establishment, and issuing the generated configuration data for inter-eNB X2 IPSec tunnel establishment to the eNB;

the eNB is further configured for receiving and saving the configuration data for inter-eNB X2 SCTP link establishment and the configuration data for inter-eNB X2 IPSec tunnel establishment automatically generated and issued by the OMC.

16. The system according to claim 13, wherein in receiving the configuration data for inter-eNB X2 SCTP link establishment and the configuration data for inter-eNB X2 IPSec tunnel establishment automatically generated and issued by the OMC, the eNB is further configured for: determining whether there is a connection to the OMC; when there is such a connection, reporting, to the OMC, the acquired IP information for inter-eNB X2 SCTP link establishment for the opposite eNB; detecting whether the negotiation parameter for inter-eNB X2 IPSec tunnel establishment is generated by the OMC; when the negotiation parameter for inter-eNB X2 IPSec tunnel establishment is not generated by the OMC, acquiring, from a negotiation parameter corresponding to an established S1 IPSec tunnel, the negotiation parameter for inter-eNB X2 IPSec tunnel establishment, and reporting, to the OMC, the acquired negotiation parameter for inter-eNB X2 IPSec tunnel establishment;

the OMC is further configured for automatically generating, according to the IP information for inter-eNB X2 SCTP link establishment reported by the eNB, the configuration data for inter-eNB X2 SCTP link establishment, and issuing the generated configuration data for inter-eNB X2 SCTP link establishment to the eNB; automatically generating, according to the negotiation parameter for inter-eNB X2 IPSec tunnel establishment reported by the eNB, the configuration data for inter-eNB X2 IPSec tunnel establishment, and issuing the generated configuration data for inter-eNB X2 IPSec tunnel establishment to the eNB;

the eNB is further configured for receiving and saving the configuration data for inter-eNB X2 SCTP link establishment and the configuration data for inter-eNB X2 IPSec tunnel establishment automatically generated and issued by the OMC.

17. A non-transitory computer storage medium, comprising instructions, which, when executed on a computer or a processor, cause the computer or processor to carry out a method for establishing an X2 IPSec tunnel, the method comprising:

acquiring, through S1 signaling, IP information for inter-Evolved NodeB (eNB) X2 Stream Control Transmission Protocol (SCTP) link establishment for an opposite eNB;

automatically generating configuration data for inter-eNB X2 SCTP link establishment and configuration data for inter-eNB X2 IPSec tunnel establishment, or receiving configuration data for inter-eNB X2 SCTP link establishment and configuration data for inter-eNB X2 IPSec tunnel establishment automatically generated and issued by an operation and maintenance center (OMC); and generating, according to the configuration data for inter-eNB X2 SCTP link establishment, an X2 SCTP message; generating, according to the configuration data for inter-eNB X2 IPSec tunnel establishment, an IPSec negotiating message; and triggering, through the X2 SCTP message, inter-eNB X2 IPSec tunnel establishment, wherein the configuration data for inter-eNB X2 IPSec tunnel establishment is generated according to a negotiation parameter for inter-eNB X2 IPSec tunnel establishment.

* * * * *